(12) United States Patent
Ishida

(10) Patent No.: US 8,631,845 B2
(45) Date of Patent: Jan. 21, 2014

(54) MOTORCYCLE TIRE FOR RUNNING ON ROUGH TERRAIN

(75) Inventor: Shingo Ishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 356 days.

(21) Appl. No.: 13/191,526

(22) Filed: Jul. 27, 2011

(65) Prior Publication Data

US 2012/0024440 A1   Feb. 2, 2012

(30) Foreign Application Priority Data

Jul. 28, 2010  (JP) ................................. 2010-169564

(51) Int. Cl.
*B60C 11/11*  (2006.01)
*B60C 11/12*  (2006.01)

(52) U.S. Cl.
USPC ............ 152/209.11; 152/209.15; 152/209.18; 152/902; 152/DIG. 3

(58) Field of Classification Search
USPC ............... 152/209.1, 209.11, 209.15, 209.18, 152/902, DIG. 3
See application file for complete search history.

(56) References Cited

U.S. PATENT DOCUMENTS

| 2008/0283167 A1 | 11/2008 | Matsumura | |
| 2011/0024009 A1* | 2/2011 | Nakamura | 152/209.1 |

FOREIGN PATENT DOCUMENTS

| DE | 3005651 | * | 8/1981 |
| JP | 2000-255220 | * | 9/2000 |
| JP | 2009-196425 | * | 9/2009 |

* cited by examiner

*Primary Examiner* — Richard Crispino
*Assistant Examiner* — Robert Dye
(74) *Attorney, Agent, or Firm* — Birch, Stewart, Kolasch & Birch, LLP

(57) ABSTRACT

A motorcycle tire for running on rough terrain comprises a tread portion provided with a plurality of blocks including a cut block. The cut block is provided with a U-shaped cut so as to define a sub part of the cut block surrounded by the cut and a main part of the cut block outside the cut. The top surface of the sub part and the top surface of the main part are displaced from each other in a normal direction to the tread surface, and an exposed outside wall surface of the sub part and an exposed outside wall surface of the main part are displaced from each other in a lateral direction parallel with the tread surface, wherein the exposed outside wall surface of the sub part is defined as extending radially inwardly from the edge of the top surface of the sub part, and the exposed outside wall surface of the main part is defined as extending radially inwardly from the edge of the top surface of the main part and positioned on each side of the exposed outside wall surface of the sub part.

20 Claims, 10 Drawing Sheets

MOTORCYCLE TIRE FOR RUNNING ON ROUGH TERRAIN

BACKGROUND OF THE INVENTION

The present invention relates to a motorcycle tire suitable for running on rough terrain, more particularly to structures of tread blocks and an arrangement the tread blocks capable of improving the steering stability on rough terrain.

Motorcycle tires designed for running on rough terrain for example for use in motocross races, are provided in the tread portion with tread blocks, and the tread blocks are arranged sparsely so that the tread blocks dig into soft ground such as sandy or muddy areas.

It is known to use the edges of the tread blocks to obtain large traction and large cornering force in order to improve the steering stability. For that purpose, usually employed techniques are to increase the size of the tread block in order to increase the edge length, and to increase the rubber hardness of the tread block so that the edge is hard to slip on the ground.

However, if the block size and/or the rubber hardness is increased, due to the increased block rigidity, there is a possibility that the ride comfort, ground contacting feeling and slide controllability are deteriorated.

SUMMARY OF THE INVENTION

It is therefore, an object of the present invention to provide a motorcycle tire suitable for running on rough terrain, in which a tread block is increased in the functional edge length, and the steering stability on rough terrain can be improved without sacrificing the ride comfort, ground contacting feeling and slide controllability.

According to the present invention, a motorcycle tire for running on rough terrain comprises a tread portion provided with a plurality of blocks including a cut block, the cut block is provided with a U-shaped cut with both ends opened so as to define a sub part of the cut block surrounded by the cut and a main part of the cut block outside the cut, a top surface of the sub part and a top surface of the main part are displaced from each other in a normal direction to the tread surface, and an exposed outside wall surface of the sub part and an exposed outside wall surface of the main part are displaced from each other in a lateral direction parallel with the tread surface, wherein the exposed outside wall surface of the sub part is defined as extending radially inwardly from the edge of the top surface of the sub part, and the exposed outside wall surface of the main part is defined as extending radially inwardly from the edge of the top surface of the main part and positioned on each side of the exposed outside wall surface of the sub part.

Accordingly, the cut block is sterically increased in the edges without increasing the size of the block and/or rubber hardness. Therefore, the steering stability can be improved without deteriorating the ride comfort, ground contacting feeling and slide controllability.

In this application including specification and claims, various dimensions, positions and the like of the tire refer to those under a normally inflated unloaded condition of the tire unless otherwise noted.

The normally inflated unloaded state is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various cold Inflation Pressures" table in TRA or the like.

BRIEF DESCRIPTION OF THE DRAWINGS

FIG. 4($b$) is a cross sectional view taken along line B-B in FIG. 4($a$).

FIG. 6($b$) is a top view of the cut block of which sub part is inverse tapered toward its outside wall surface.

FIG. 9($b$) is a cross sectional view taken along line C-C in FIG. 9($a$).

DESCRIPTION OF THE PREFERRED EMBODIMENTS

Figure 1:
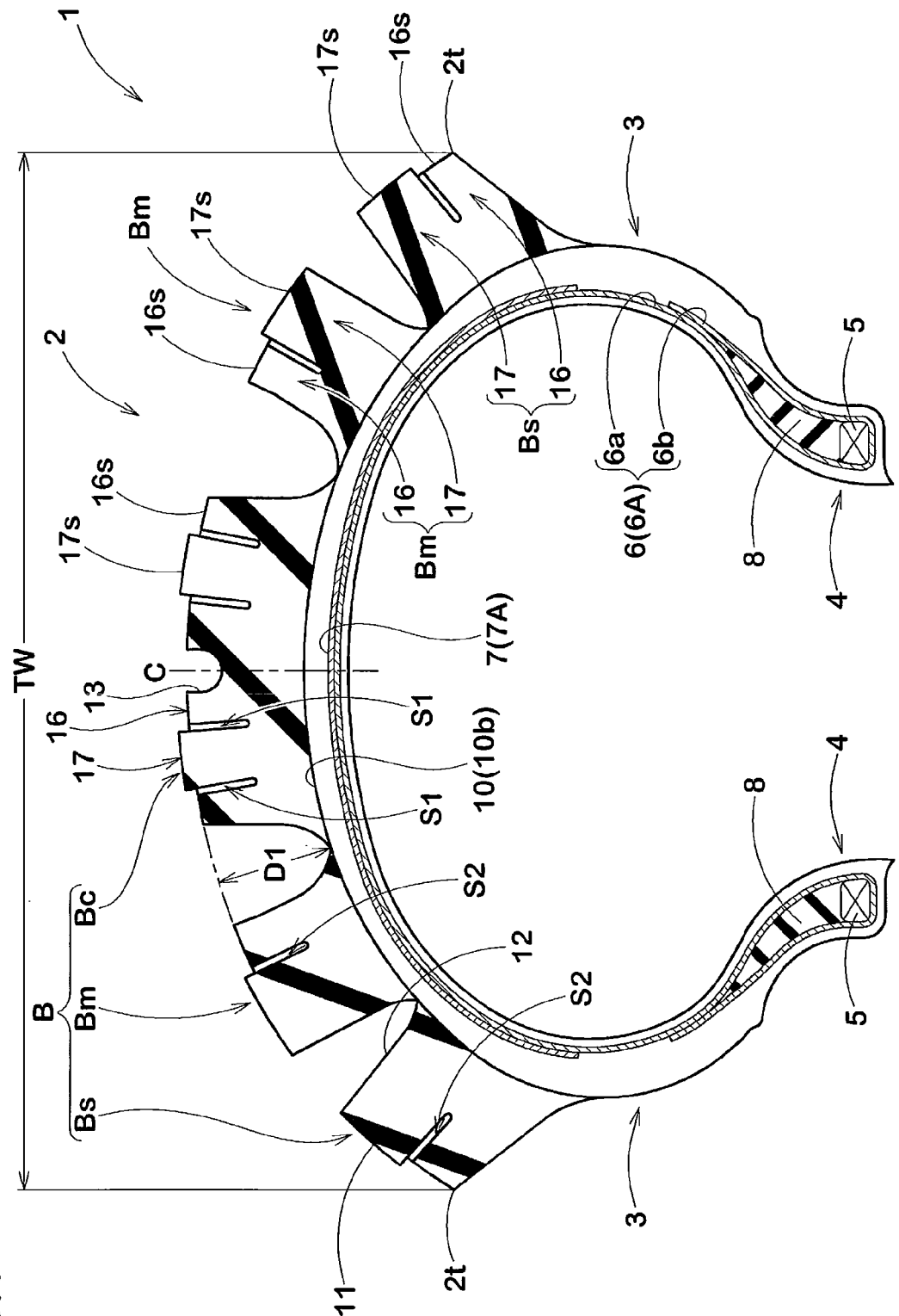
FIG. 1 is a cross sectional view of a motorcycle tire for running on rough terrain according to an embodiment of the present invention.

Embodiments of the present invention will now be described in detail in conjunction with the accompanying drawings.

In the drawings, motorcycle tire 1 according to the present invention comprises a tread portion 2 having tread edges 2$t$, a pair of bead portions 4 with a bead core 5 therein, a pair of sidewall portions 3 extending between the tread edges and bead portions, a carcass 6 extending between the bead portions 4 through the tread portion 2 and sidewall portions 3, and a tread reinforcing layer 7 disposed radially outside the carcass 6 in the tread portion 2.

The tread portion 2 is curved convexly so that the maximum cross section width TW of the tire lies between the tread edges 2$t$ as shown in FIG. 1. In FIG. 1, there is shown a cross section of the tire 1 taken along a line A-A of FIG. 2 under the normally inflated unloaded state.

The carcass 6 is composed of one or more, in this example, only one ply 6A of carcass cords extending between the bead portions 4 through the tread portion 2 and sidewall portions 3 and turned up around the bead core 5 in each of the bead portions 4 from the inside to the outside of the tire so as to form a pair of carcass ply turned up portions 6$b$ and a carcass ply main portion 6a therebetween. In this example, organic fiber cords are used as the carcass cords.

The carcass 6 in this example is of a radial structure, and the carcass cords in the carcass ply 6A are arranged radially at an angle of from 75 to 90 degrees with respect to the tire circumferential direction. However, it is also possible that the carcass 6 has a bias structure. Namely, the carcass 6 comprises at least two cross plies of carcass cords arranged obliquely, for example, at angles of 15 to 45 degrees with respect to the tire circumferential direction.

Meanwhile, between the carcass ply main portion 6a and turned up portion 6b in each of the bead portions, there is disposed a bead apex 8 made of a hard rubber compound extending radially outwardly from the radially outside of the bead core 5 in order to reinforce the bead portion 4 and a sidewall lower portion.

The above-mentioned tread reinforcing layer 7 is composed of one or more, in this example, only one ply 7A of reinforcing cords laid at an inclination angle of from 15 to 45 degrees with respect to the tire circumferential direction.
In this example, organic fiber cords are used as the reinforcing cords.

The tread portion 2 is provided with a plurality of blocks B separated from each other by tread grooves 10.

The depth D1 of the tread grooves 10 is set in a range of about 10 to 20 mm.

Figure 2:
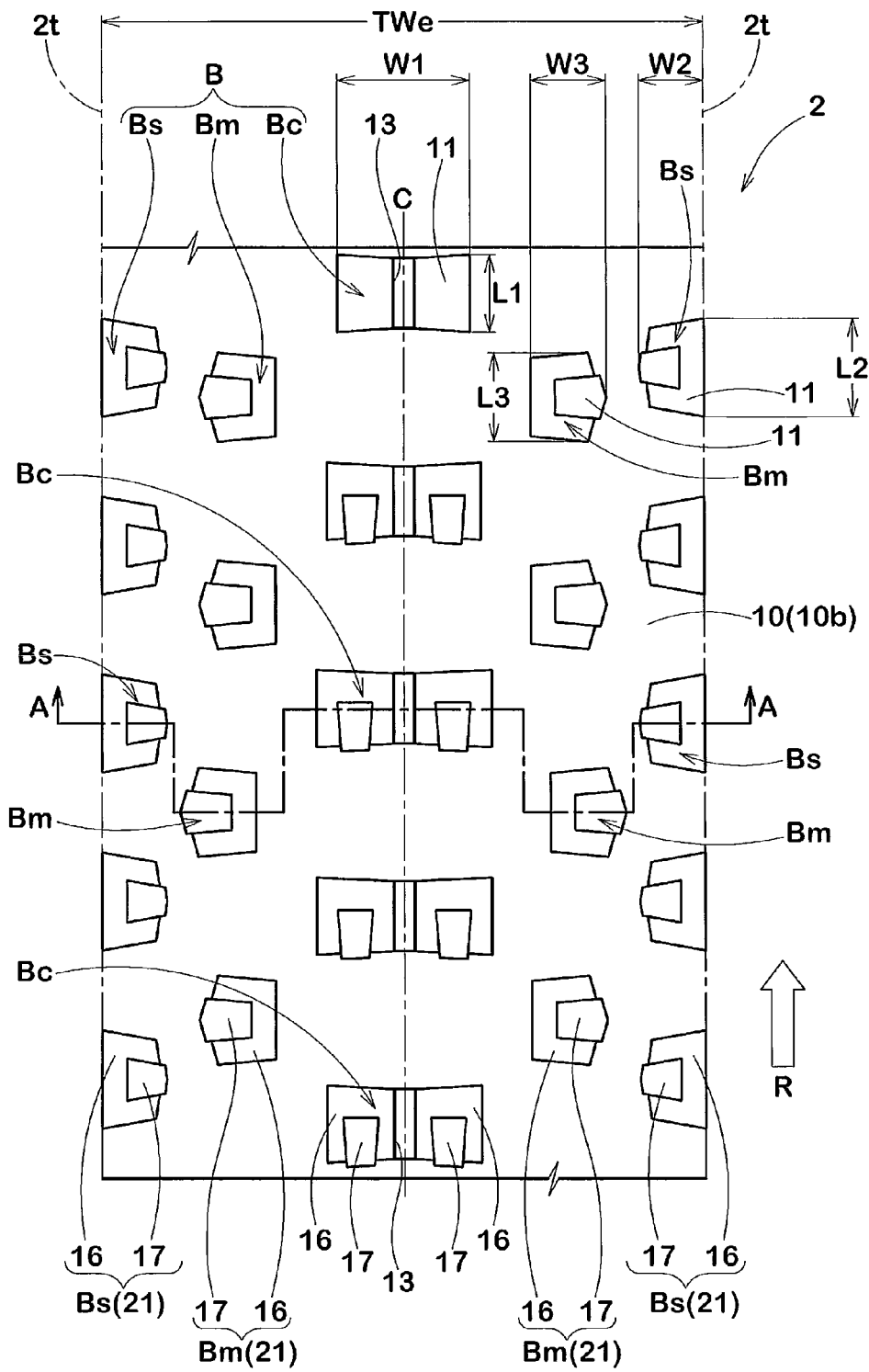
FIG. 2 and FIG. 3 are developed partial views of the tread portion thereof.

FIG. 2 shows an example of the tread pattern designed for use in motocross races so as to bring out maximum performance on soft ground such as sandy area and muddy area.

As shown in FIG. 2, the blocks B are arranged sparsely when compared with tires in other categories such as passenger car tires, and the land ratio (Sb/S) is preferably set in a range of from 15 to 30%.

Given that each block B has a ground contacting top surface 11 contacting with the ground, and an outside wall surface 12 extending radially inwardly from the peripheral edge of the top surface 11 towards the bottom 10b of the tread grooves, the land ratio (Sb/S) is defined by a ratio of the total area Sb of the top surfaces 11 of all of the blocks B to the gross area S of the tire tread (namely, the area of the radially outer surface of the tread portion 2 including the grooved area).

As the tread grooves 10 are very broad and have complex shapes when compared with a passenger car tire and the like, the grooved area of the tread portion is hereinafter referred to as "sea area 10".

The bottom 10b of the sea area 10 extends substantially parallel with the radially outer surface of the carcass 6.

Therefore, the blocks B can efficiently dig into the soft grounds and produce a larger traction. Further, as the sea area 10 is broad, the mud compressed between the blocks can be easily self-ejected during tire revolution.

If the land ratio (Sb/S) is more than 30%, the traction on the soft grounds becomes insufficient. If the land ratio (Sb/S) is less than 15%, the traction becomes insufficient on the hard and medium grounds.

The blocks B include center block Bc disposed on the tire equator c, shoulder blocks Bs disposed along the tread edges 2t, and middle blocks Bm disposed between the center blocks BC and shoulder blocks Bs.

The center block Bc is formed to have the top surface 11 having an axially long rectangular shape in which the axial width W1 is larger than the circumferential length L1. Preferably, the circumferential length L1 is set in a range of about 35 to 65% of the axial width W1, and the axial width W1 of the top surface 11 of the center block Bc is set in a range of about 20 to 35% of the developed tread width TWe.

By employing such axially long shapes in the center blocks Bc, the axial component of the block edges is increased, and the traction performance during straight running can be improved.

In this example, the center block Bc is provided with a shallow groove 13 extending in the tire circumferential direction and having a depth less than the depth D1 of the tread grooves.

The shoulder block Bs is formed to have the top surface 11 having a circumferentially long shape in which the circumferential length L2 is larger than the axial width W2. Preferably, the circumferential length L2 is set in a range of about 115 to 150% of the axial width W2, and the axial width W2 is set in a range of about 9 to 14% of the developed tread width TWe.

By employing such circumferentially long shapes in the shoulder blocks Bs, the circumferential component of the block edges is increased, and the cornering performance on soft ground can be improved.

The middle block Bm is formed to have the top surface 11 having such a shape that the circumferential length L3 is the substantially same as the axial width W3 in order to balance between the contribution to the straight running performance and the contribution to cornering performance.
Preferably, the circumferential length L3 is set in a range of about 90 to 130% of the axial width W3, and the axial width W3 is set in a range of about 10 to 15% of the developed tread width TWe.

The tread blocks B include a cut block 21 of which top surface 11 is provided with a cut 14.

The cut 14 extends from the top surface 11 of the cut block 21 to a certain depth D2 less than the block height.

The cut 14 can be considered as being made up of a pair of first segments S1 and a second segment S2 connecting between the first segments S1 so as to have a U-shaped configuration with two ends opened when viewed from above the cut block 21.

Figure 10:
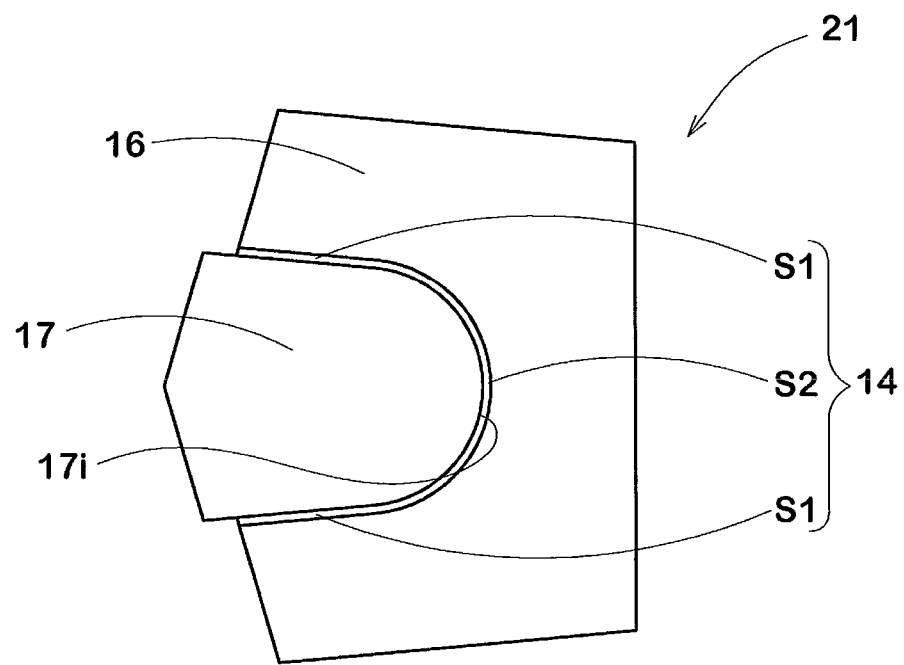
FIG. 10 is a top view of still another example of the cut block.

As shown in FIG. 10, the U-shaped configuration of the cut 14 can be U-shaped with round corners, wherein the second segment S2 is curved in the form of a circular arc between the inner ends of the first segments S1.

In this embodiment, however, the U-shaped configuration of the cut 14 is U-shaped with substantially-right-angled corners, wherein the first segments S1 extend straight from the edge of the top surface 11 into the tread block, and the second segment S2 extends straight between the inner ends of the first segments S1.

In any case, by the cut 14, at least surface part of the cut block 21 is divided into a sub part 17 inside the cut 14 and a main part 16 outside the cut 14.

As the main part 16 is U-shaped, the main part 16 surrounds the sub part 17 in three of four orthogonal directions of the sub part 17. Therefore, in the remaining one of the four orthogonal directions, the sub part 17 is provided with an exposed outside wall surface 17o extending radially inwardly from an edge of the top surface 17s. And the sub part 17 is provided with a substantially unexposed inside wall surface 17i extending radially inwardly from an edge of the top surface 17s which edge extends along the first and second segments S1 and S2.

In this embodiment, the sub part 17 has a top surface 17s which is substantially rectangular.

In a lateral direction parallel with the top surface 11 of the cut block 21, the outside wall surface 17o is displaced from an exposed outside wall surface 16o of the main part 16 which surface 16o is located on each side of the outside wall surface 17o and extends radially inwardly from the edge of the top surface 16s.

Further, in the normal direction to the tread surface, the top surface 17s of the sub part 17 is displaced from the top surface 16s of the main part 16 so that the top surface 17s and top surface 16s have different heights.

The amount P1 of displacement or the height difference is not less than 0.3 mm, preferably not less than 1.0 mm, but preferably not more than 3.0 mm, more preferably not more than 2.0 mm.

The amount P2 of displacement between the outside wall surface 17o of the sub part and the outside wall surface 16o of the main part is not less than 0.3 mm, preferably not less than 1.5 mm, but preferably not more than 3.0 mm, more preferably not more than 2.5 mm.

The thickness of the cut, namely, the thicknesses W4 of the first and second segments S1 and S2 are not less than 0.5 mm, preferably not less than 1.0 mm, but not more than 3.0 mm, preferably not more than 2.0 mm.

The depths D2 of the first and second segments S1 and S2 are not less than 0.5 mm, preferably not less than 1.0 mm, but not more than 5.0 mm, preferably not more than 4.0 mm.

Therefore, by the top surfaces of the sub part and main part, the outside wall surfaces of the sub part and main part and the like, the cut block 21 is increased in multidirectional edge components functional in increasing the traction, cornering force and the like. Thereby, the steering stability on rough terrain can be improved.

Further, as the tire is improved in the steering stability without increasing the size of the block and the rubber hardness, it is avoided that the ride comfort, ground contacting feeling and slide controllability are deteriorated by the increased block rigidity.

If the amount P1, P2 of the displacement is less than 0.3 mm, it becomes difficult to increase the functional edge components. If the amount P1, P2 is more than 3.0 mm, there is a tendency that the ride comfort, ground contacting feeling and slide controllability are deteriorated.

If the thicknesses W4 of the first and second segments S1 and S2 are less than 0.5 mm, large friction occurs between the main part 16 and the sub part 17, therefore, it is difficult to obtain appropriate motions of the sub part 17 relative to the main part. If the thicknesses W4 are more than 3.0 mm, the rigidity of the cut block 21 is greatly decreased.

Figure 5A:
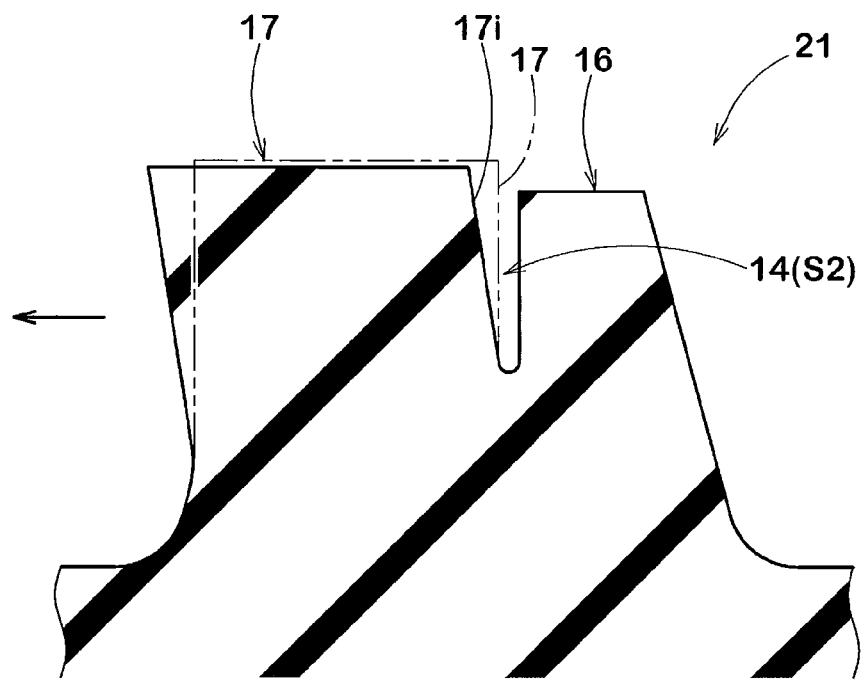
FIGS. 5($a$) and 5($b$) are cross sectional views similar to FIG. 4($b$), showing lateral motions of the sub part.

As shown in FIG. 5(a), when the sub part 17 is moved toward its outside wall surface 17o, the thickness of the cut 14 is partially increased and the length of the functional edges is increased to improve the steering stability.

Figure 5B:
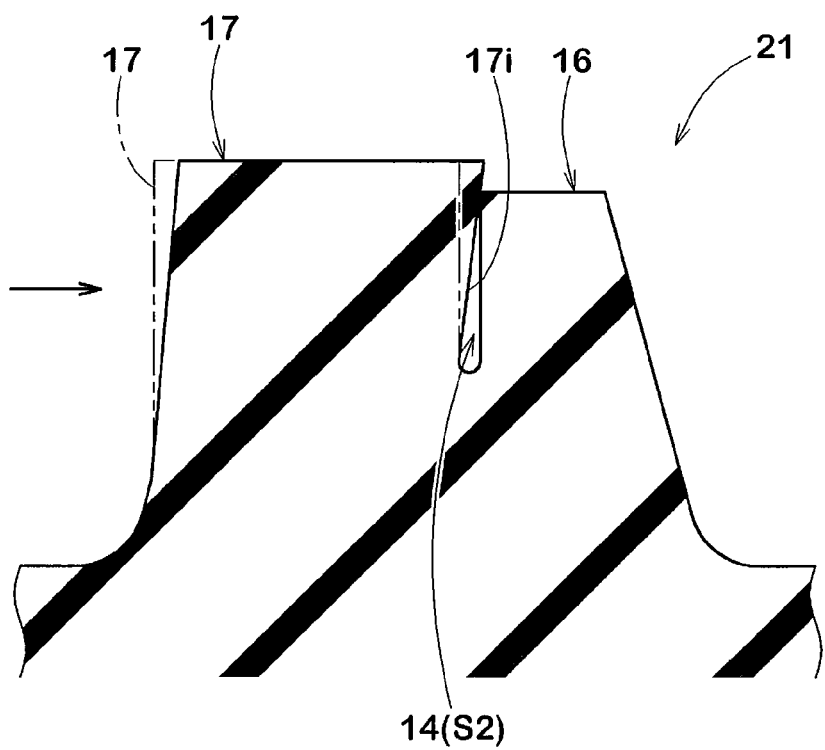

As shown in FIG. 5(b), when the sub part 17 is moved toward the opposite side of its outside wall surface 17o, the second segment 52 is closed, and the sub part 17 and main part 16 function as one body to increase the block rigidity.

In this embodiment, the top surface 17s of the sub part 17 is higher than the top surface 16s of the main part 16, therefore, the sub part 17 protrudes from the main part 16. Further, the outside wall surface 17o of the sub part 17 protrudes from the outside wall surface 16o of the main part 16.

The width W5 of the top surface 16s of the main part 16 is preferably not less than 3.0 mm, more preferably not less than 5.0 mm. Here, the width W5 means the distance from any point on the top surface's inner edge adjacent to the first and second segments S1 and S2 to the top surface's outer edge measured along the normal direction to the top surface's inner edge.

If the width W5 is less than 3.0 mm, as the strength of the main part 16 is excessively decreased, there is a possibility that the main part 16 is easily broken.

If the width W5 becomes too wide, as the top surface 17s of the sub part 17 becomes small accordingly, it becomes difficult to obtain the effect of the increased edge length. Therefore, it is preferable that the width W5 of the top surface 16s of the main part 16 is not more than 8.0 mm, more preferably not more than 7.0 mm.

Preferably, the width W7 of the sub part 17 is set in a range of not less than 5.0 mm, more preferably not less than 7.0 mm, but not more than 12.0 mm, more preferably not more than 10.0 mm. Here, the width W7 is measured perpendicularly to a straight center line between the first segments S1.

Figure 6A:
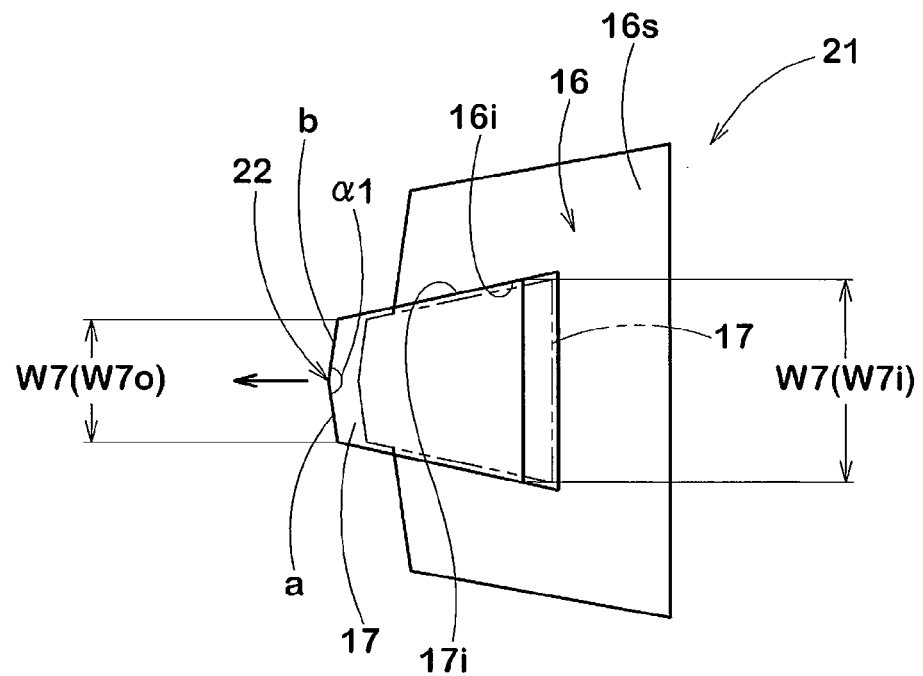
FIG. 6($a$) is a top view of the cut block of which sub part is tapered toward its outside wall surface.

As shown in FIG. 6(a), the width W7 can be gradually increased from the above-mentioned outside wall surface 17o towards the opposite side of the sub part 17 thereto. In other wards, the sub part is tapered toward the outside wall surface 17o.

Figure 6B:
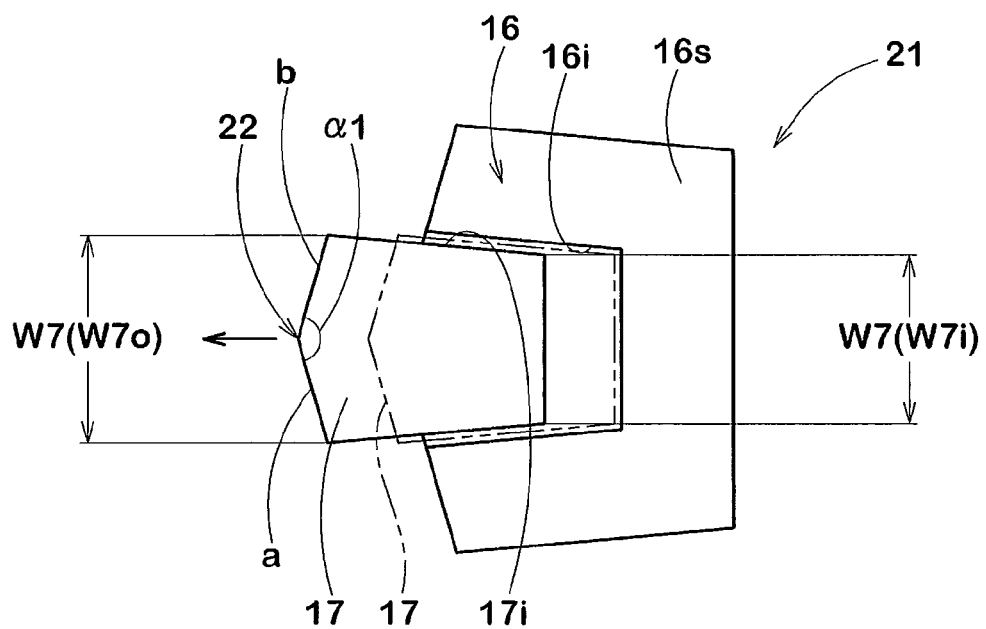

Further, as shown in FIG. 6(b), the width W7 can be gradually decreased from the outside wall surface 17o towards the opposite side of the sub part 17 thereto. In other wards, the sub part is inverse tapered toward the outside wall surface 17o.

In the case that the width W7 is gradually increased as shown in FIG. 6(a), when the sub part 17 is moved relatively to the main part 16 towards the outside wall surface 17o from the opposite side, owing to the friction between the opposite inside wall surfaces 16i and 17i, the relative motion of the sub part 17 is restricted, and as a result, breaking or tearing-off of the block can be prevented to improve the durability.

Even so, in order to allow appropriate relative motion for obtaining the above described effect, the width W7o at the outer end is preferably set in a range of not less than 0.4 times, more preferably not less than 0.5 times, but not more than 0.95 times, more preferably not more than 0.8 times the width W7i at the inner end.

In the case that the width W7 is gradually decreased as shown in FIG. 6(b), since less or no friction occurs between the opposite inside wall surfaces 16i and 17i, the motion of the sub part 17 relative to the main part 16 is not restricted, therefore, the above described effect to increase the edge component can be further enhanced by increasing the relative motion. In order to obtain the increased relative motion, preferably the width W7o at the outer end is set to be not less than 1.05 times, more preferably not less than 1.1 times the width W7i at the inner end. However, it is preferred that the width W7o at the outer end is not more than 1.5 times, more preferably not more than 1.3 times the width W7i at the inner end. If more than 1.5 times, the edge component along the second segment S2 is liable to be excessively decreased.

In either case, the outside wall surface 17o of the sub part can be formed as a V-shaped bent surface 22 protruding outwardly of the cut block and made up of two substantially-flat surfaces (a and b) of which line of intersection is substantially perpendicular to the tread surface.

The intersecting angle α1 of the two surfaces is preferably not less than 100 degrees, more preferably not less than 110 degrees, but not more than 160 degrees, more preferably not more than 150 degrees.

By the resultant ridge between the two substantially-flat surfaces (a and b), the edge component is increased to improve the steering stability.

If the angle α1 is less than 100 degrees, the rigidity of the ridge is decreased, and it becomes difficult to improve the steering stability. If the angle α1 is more than 160 degrees, the ridge can not form a functional edge.

If the rubber hardness of the cut block 21 is too low, the block rigidity is excessively decreased, and the effect to increase the edge components can not be expected. If the rubber hardness of the cut block 21 is too high, it becomes difficult to obtain the relative motion of the sub part 17. Therefore, the rubber hardness of the cut block 21 is preferably not less than 60 degrees, more preferably not less than 70 degrees, but not more than 90 degrees, more preferably not more than 85 degrees.

In this specification, the rubber hardness means the durometer type A hardness measured at 23 deg.C. according to Japanese Industrial standard K6253.

In the case of the cut block 21 as the center block Bc, in order to improve the grip performance during straight running, the outside wall surface 17o of the sub part is preferably oriented towards one circumferential direction.

In this embodiment, therefore, the first segments S1 extend in the tire circumferential direction.

As described, the center block Bc in this example is wide in the tire axial direction, and the shallow groove 13 is disposed at the center of the axial width.
Therefore, in order to further increase the edge component, the cut 14 is formed on each side of the shallow groove 13 so as to orient toward the same direction.
Thereby, the grip performance during straight running can be greatly improved, while maintaining the braking performance.

In the case that the tire 1 has a designed intended rotational direction R (usually, indicated in the sidewall portion 3), it is preferable that, in the ground contacting patch of the tire, the outside wall surface 17o of the sub part is oriented towards the traveling direction (namely, the opposite direction to the tire rotational direction R) so as to form a part of the block surface Bco facing the traveling direction.

Figure 7:
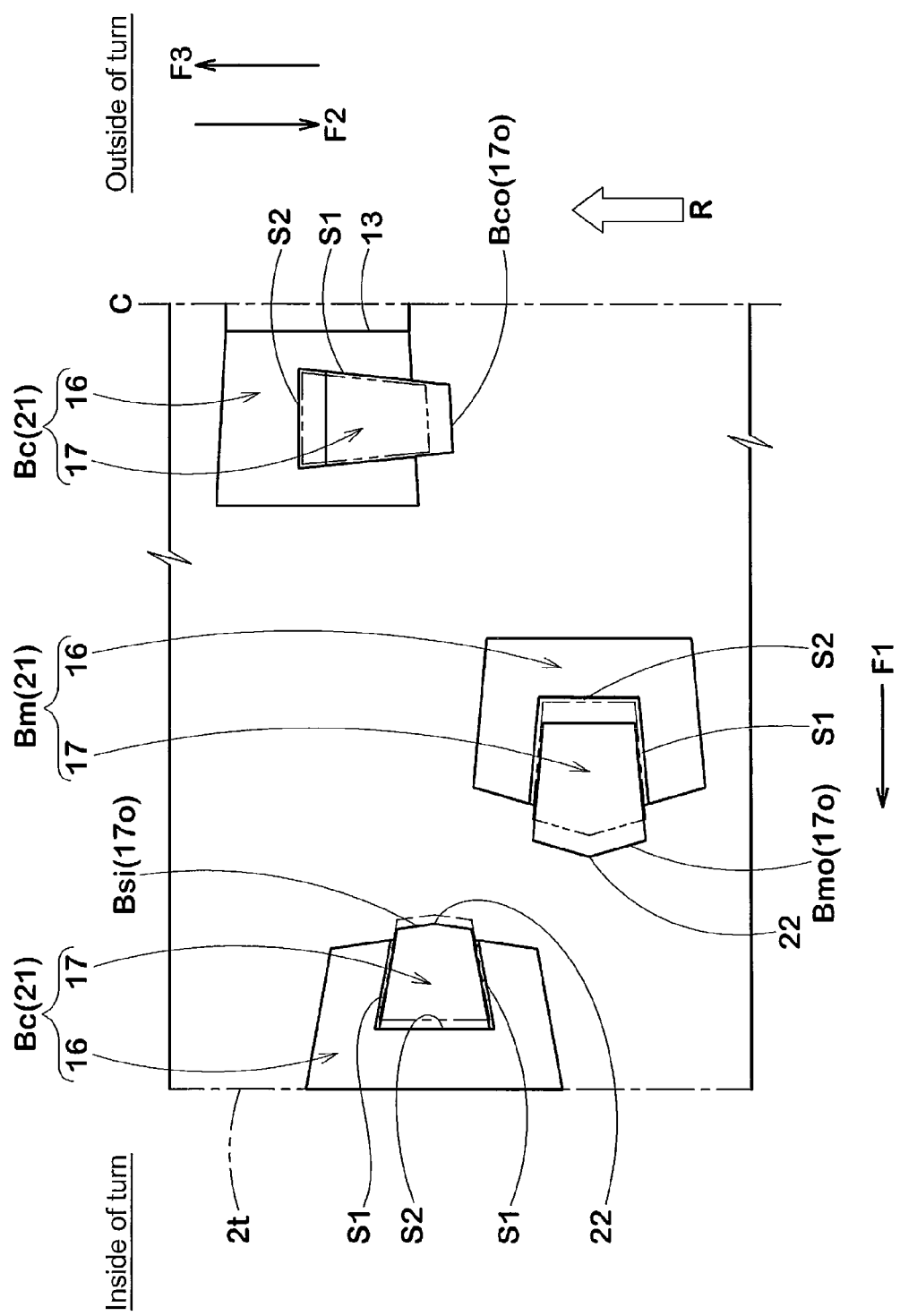
FIG. 7 and FIG. 8 are plan views each showing an arrangement the middle block and shoulder block.

Further, as shown in FIG. 7, it is preferable that the width W7 of the sub part 17 is gradually increased towards the rotational direction R. Namely, the use of the example of FIG. 6(a) is preferred. But, unlike FIG. 6(a), it is preferable that the outside wall surface 17o of the sub part is a flat surface in view of the uneven wear resistance.

By such arrangement, at the time of acceleration, an excessive motion of the sub part 17 due to the frictional force F2 received from the ground is prevented. Further, undesirable decrease in the overall rigidity of the block can be prevented while increasing the edge components to improve the grip performance.

Incidentally, it is not always necessary that all of the center blocks Bc are the cut block 21. Depending on the use conditions, the center blocks BC without the cut 14 may be used in combination with the center blocks Bc with the cut 14.

FIG. 7 shows an arrangement of the middle block Bm and shoulder block Bs.

In this arrangement, in the case of the cut block 21 as the middle block Bm, the outside wall surface 17o of the sub part is oriented toward the axially outside so as to form a part of the axially outer surface Bmo of the middle block Bm.

In the case of the cut block 21 as the shoulder block Bs, the outside wall surface 17o of the sub part is oriented toward the axially inside so as to form a part of the axially inner surface Bsi of the shoulder block Bs.

In either case, the first segments S1 extends axially of the tire. More specifically, the center line between the first segments S1 is parallel with the tire axial direction.

In the middle block Bm, therefore, during cornering, the sub part 17 is moved axially from the main part 16 by a frictional force F1 towards the cornering center received from the ground. Thereby, the middle block Bm can greatly increased in the edge components, and the slide controllability, grip performance and ground contacting feeling can be improved.

In the shoulder block Bs, on the other hand, at the maximum bank angle during cornering, the sub part 17 is moved axially to tightly contact with the main part 16 by the frictional force F1, and the apparent rigidity of the cut block is increased. Further, the shoulder block Bs is increased in the edge components in its axially inner side.
Therefore, the grip performance can be increased in a wide bank angle range, and the behavior of the motorcycle during cornering can be stabilized.

In the case of the middle block Bm, it is preferable that, as shown in FIG. 6(b), the width W7 is gradually decreased and the v-shaped bent surface 22 is employed.
Thereby, the displacement of the sub part 17 is increased in proportion to the magnitude of the frictional force F1, and the steering stability can be greatly improved.

In the case of the shoulder block Bs, it is preferable that, as shown in FIG. 6(a), the width W7 is gradually increased and the v-shaped bent surface 22 is employed.
Therefore, the sub part 17 unites with the main part 16 after the sub part 17 is displaced by a certain degree.
Thereby, it is possible to withstand sudden slide, and the steering stability can be further improved.

Figure 8:
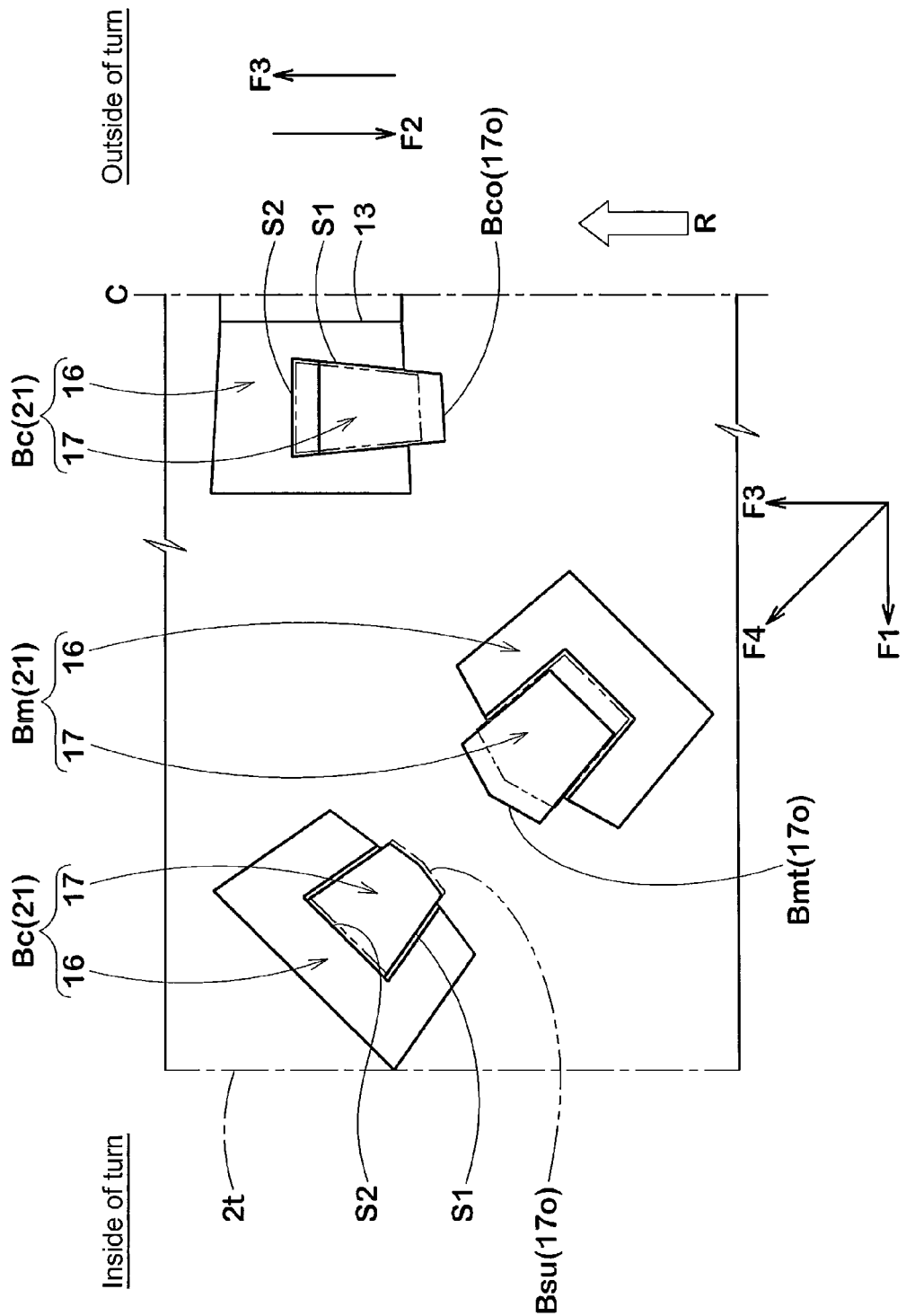

FIG. 8 shows another arrangement of the middle block Bm and shoulder block Bs.

In this arrangement, the outside wall surface 17o of the middle block Bm is oriented in an oblique direction inclined to the tire rotational direction R toward the axially outside from the axial inside, and
the outside wall surface 17o of the shoulder block Bs is oriented in the opposite direction to the above-mentioned oblique direction so as to confront with the outside wall surface 17o of the middle block Bm.

It is not always essential, but in this example, the center line between the first segments S1 of the middle block Bm and the center line between the first segments S1 of the shoulder block Bs are parallel with the above-mentioned oblique direction.
Further, it is not always essential, but in this example, the above-mentioned two center lines are aligned with each other. The type of each block Bm, Bs (namely, the width W7 is gradually increased or gradually decreased) is the same as the above-mentioned arrangement shown in FIG. 7.

In the middle block Bm, therefore, the outside wall surface 17o of the sub part forms a part of a middle block's oblique outside wall surface Bmt located on the axially outside and the heel-side in tire rotational direction R.

In the case of such middle block Bm, the sub part 17 can be displaced readily by a resultant force F4 of a frictional force F1 toward the cornering center occurring during cornering and a frictional force F3 occurring during decelerating. As a result, slide controllability, grip performance and ground contacting feeling can be further improved.

In the shoulder block Bs, on the other hand, the outside wall surface 17o of the sub part forms a part of a shoulder block's oblique inside wall surface Bsu located on the axially inside and the toe-side in tire rotational direction R.

In the case of such shoulder block Bs, even if the resultant force F4 at the maximum bank angle during cornering is applied to the block Bs, as the displacement of the sub part 17 is restricted, the steering stability can be improved.

Figure 9A:
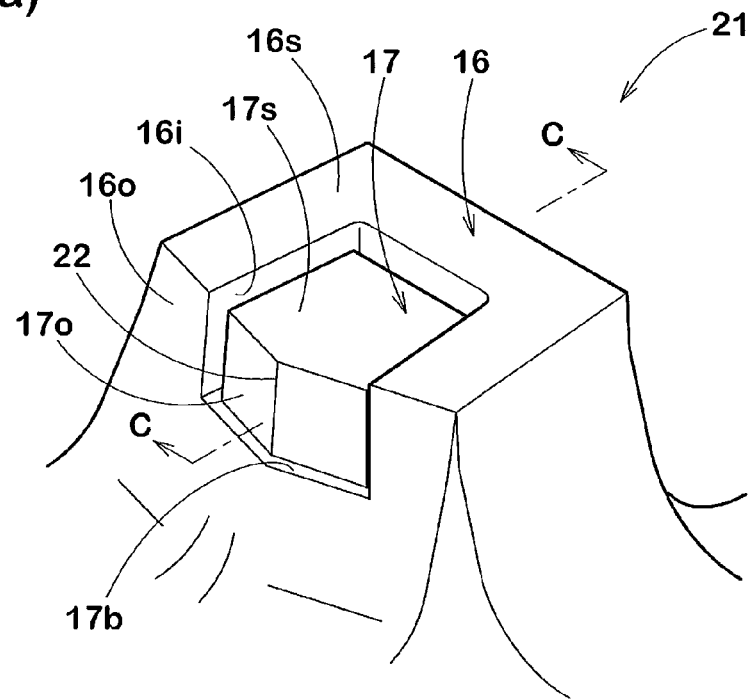
FIG. 9($a$) is a perspective view of another example of the cut block.
Figure 9B:
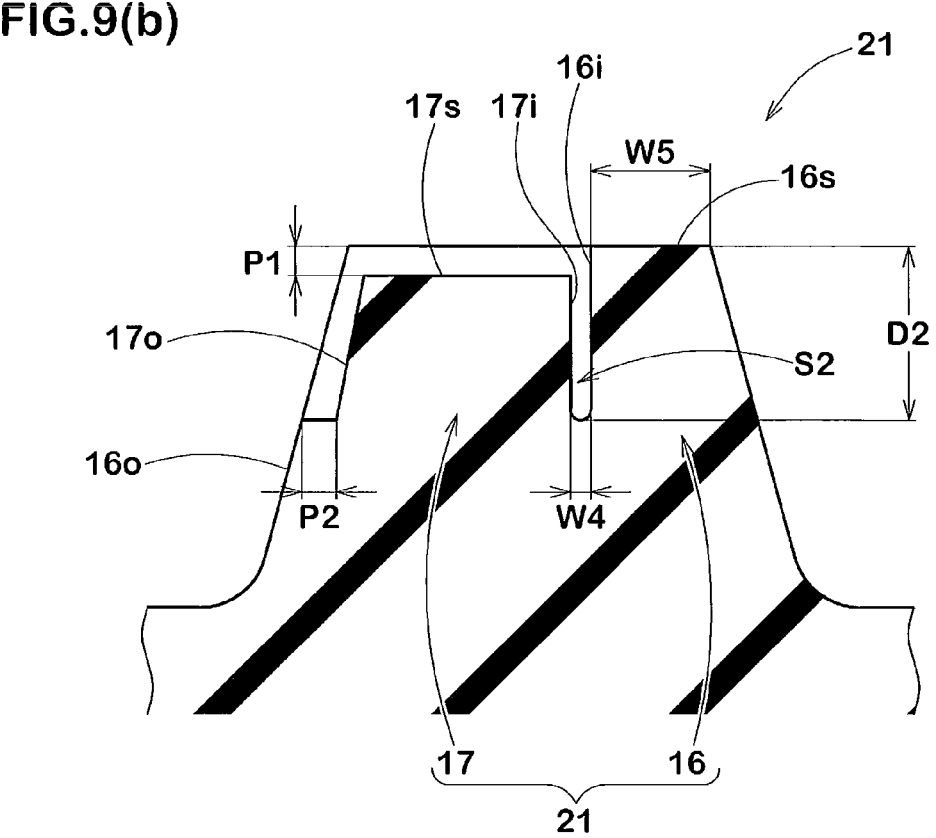

FIGS. 9(a) and 9(b) show another embodiment of the cut block 21, in which the top surface 16s of the main part 16 protrudes from the top surface 17s of the sub part 17, and the outside wall surface 16o of the main part protrudes from the outside wall surface 17o of the sub part.

In this case too, the edge components are increased by the top surface 16s of the main part 16, the outside wall surface 16o of the main part, the inside wall surface 16i of the main part, and a bottom face 17b extending from the outside wall surface 16o of the main part to the outside wall surface 17o of the sub part.

Aside from the above-described two combinations, the following combinations (I) and (II) are also possible in the above-described block arrangements:

(I) the top surface 16s of the main part 16 protrudes from the top surface 17s of the sub part 17, and the outside wall surface 17o of the sub part protrudes from the outside wall surface 16o of the main part;

(II) the top surface 17s of the sub part 17 protrudes from the top surface 16s of the main part 16, and the outside wall surface 16o of the main part protrudes from the outside wall surface 17o of the sub part.

Comparison Tests

Motorcycle tires having the internal structure shown in FIG. 1 and specifications shown in Table 1 were prepared and tested.

In the test, a 450 cc motorcycle provided on the front wheel and rear wheel with test tires (tire pressure: front=rear=80 kPa) was run on rough terrain in a tire test course by a professional test rider, and the steering stability (grip performance) during cornering, ride comfort, ground contacting feeling and slide controllability were evaluated by the test rider into ten ranks wherein the higher rank number is better. The test results are shown in Table 1.

Specifications common to all of the test tires are as follows.
Front wheel
  tire size: 90/100-21 (rim size: 1.60×21)
Rear wheel
  tire size: 120/80-19 (rim size: 2.15×19)
Maximum tire section width TW: 145 mm
Developed tread width TWe: 175 mm
Land ratio (Sb/S): 25%
Tread groove depth D1: 15 mm
First and second segments:
  thickness W4: 1.0 mm
  depth D2: 3.0 mm
Cut block:
  main part width W5: 4.0 to 6.0 mm
  sub part width W7: 9.0 to 11.0 mm
center block:
  width W1: 40 mm (23% of TWe)
  circumferential length L1: 20 mm (50% of W1)
Shoulder block:
  width W2: 20 mm (11.4% of TWe)
  circumferential length L2: 25 mm (125% of W2)
Middle block:
  width W3: 20 mm (11.4% of TWe)
  circumferential length L3: 25 mm (125% of W3)

From the test results, it was confirmed that the steering stability on the rough terrain can be improved while preventing deterioration in the ride comfort, ground contacting feeling and slide controllability.

TABLE 1

Figure 3:
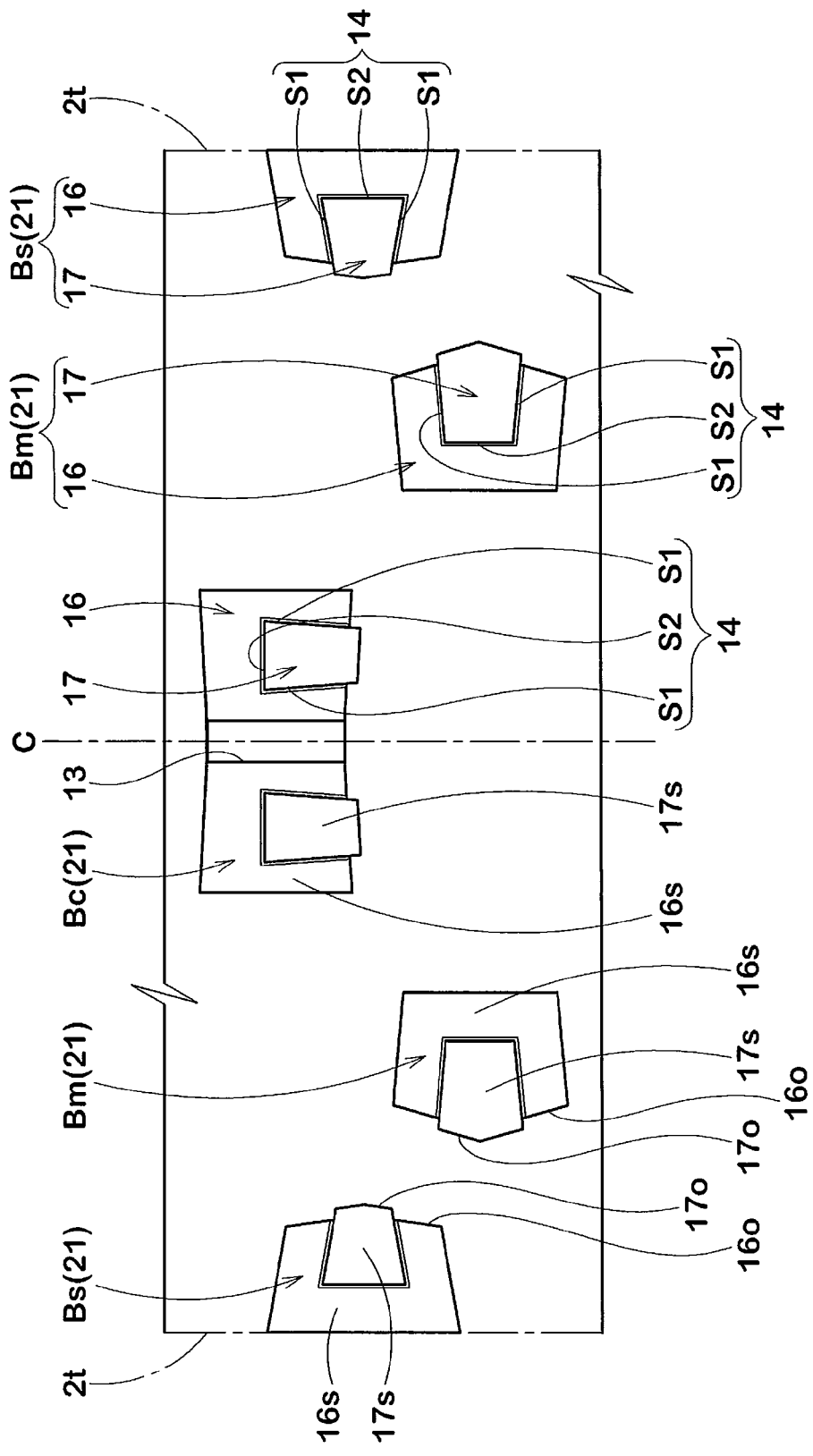
Figure 4A:
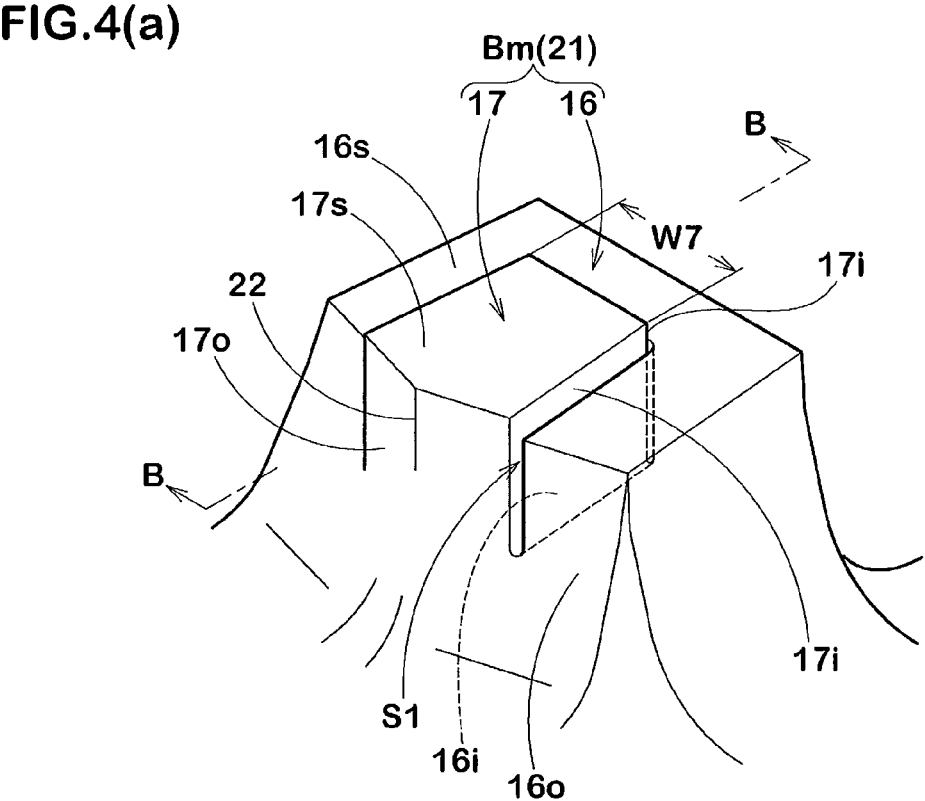
FIG. 4($a$) is a perspective view of an example of the cut block.
Figure 4B:
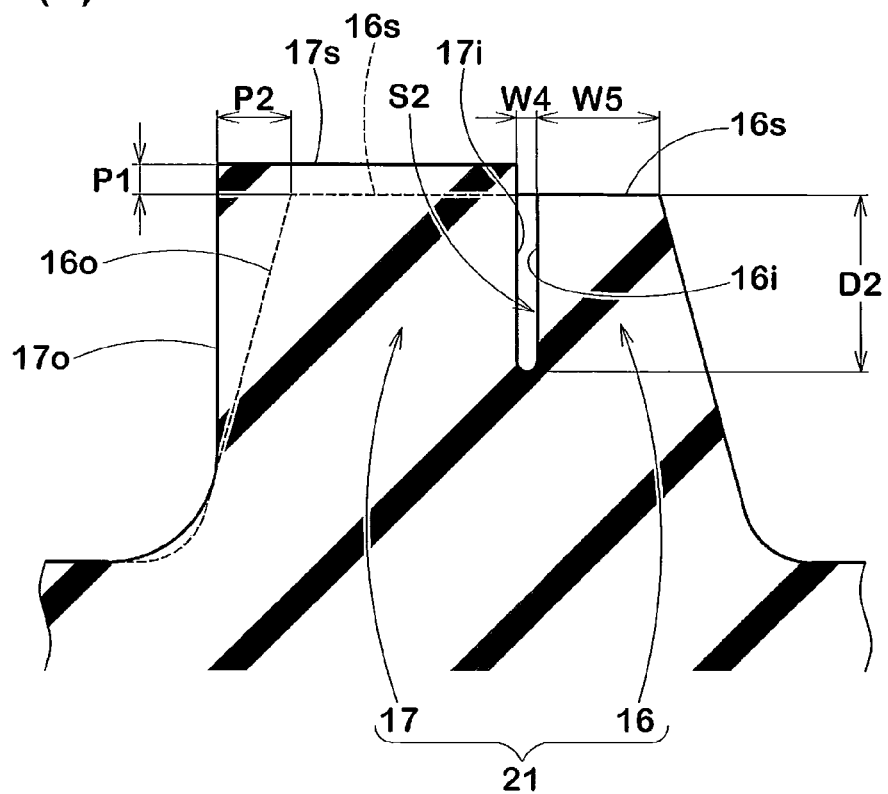

| Tire | Ref. 1 | Ex. 1 | Ex. 2 | Ex. 3 | Ex. 4 | Ex. 5 |
|---|---|---|---|---|---|---|
| Tread developed view | — | FIG. 3 | FIG. 3 | FIG. 3 | FIG. 3 | FIG. 3 |
| Cut block | without | with | with | with | with | with |
| view | — | FIG. 4(a) | FIG. 4(a) | FIG. 4(a) | FIG. 4(a) | FIG. 4(a) |
| displacement P1 (mm) | — | 1.0 | 0.3 | 3.0 | 1.0 | 1.0 |
| displacement P2 (mm) | — | 2.0 | 0.3 | 3.0 | 2.0 | 2.0 |
| rubber hardness (deg.) | — | 80 | 80 | 80 | 60 | 90 |
| Center block | | | | | | |
| width W7o (mm) | — | 7.0 | 7.0 | 7.0 | 7.0 | 7.0 |
| width W7i (mm) | — | 8.5 | 8.5 | 8.5 | 8.5 | 8.5 |
| W7o/W7i | — | 0.82 | 0.82 | 0.82 | 0.82 | 0.82 |
| Middle block | | | | | | |
| width W7o (mm) | — | 11.0 | 11.0 | 11.0 | 11.0 | 11.0 |
| width W7i (mm) | — | 9.0 | 9.0 | 9.0 | 9.0 | 9.0 |
| W7o/W7i | — | 1.22 | 1.22 | 1.22 | 1.22 | 1.22 |
| V-shaped bent surface | — | with | with | with | with | with |
| angle α1 (deg.) | — | 145 | 145 | 145 | 145 | 145 |
| Shoulder block | | | | | | |
| width W7o (mm) | — | 7.0 | 7.0 | 7.0 | 7.0 | 7.0 |
| width W7i (mm) | — | 10.0 | 10.0 | 10.0 | 10.0 | 10.0 |
| W7o/W7i | — | 0.7 | 0.7 | 0.7 | 0.7 | 0.7 |
| V-shaped bent surface | — | with | with | with | with | with |
| angle α1 (deg.) | — | 160 | 160 | 160 | 160 | 160 |
| Test results | | | | | | |
| steering stability | 5 | 9 | 6 | 7 | 6 | 8 |
| ride comfort | 5 | 9 | 8 | 8 | 5 | 6 |
| ground contacting feeling | 5 | 9 | 8 | 8 | 6 | 6 |
| slide controllability | 5 | 10 | 6 | 7 | 7 | 6 |

| Tire | Ex. 6 | Ex. 7 | Ex. 8 | Ex. 9 | Ex. 10 | Ex. 11 |
|---|---|---|---|---|---|---|
| Tread developed view | FIG. 3 | FIG. 3 | FIG. 3 | FIG. 3 | FIG. 3 | FIG. 3 |
| Cut block | with | with | with | with | with | with |
| view | FIG. 4(a) | FIG. 4(a) | FIG. 4(a) | FIG. 4(a) | FIG. 4(a) | FIG. 4(a) |
| displacement P1 (mm) | 1.0 | 1.0 | 1.0 | 1.0 | 1.0 | 1.0 |
| displacement P2 (mm) | 2.0 | 2.0 | 2.0 | 2.0 | 2.0 | 2.0 |
| rubber hardness (deg.) | 80 | 80 | 80 | 80 | 80 | 80 |

TABLE 1-continued

| Center block | | | | | | |
|---|---|---|---|---|---|---|
| width W7o (mm) | 8.5 | 7.0 | 7.0 | 7.0 | 7.0 | 7.0 |
| width W7i (mm) | 7.0 | 8.5 | 8.5 | 8.5 | 8.5 | 8.5 |
| W7o/W7i | 1.21 | 0.82 | 0.82 | 0.82 | 0.82 | 0.82 |
| Middle block | | | | | | |
| width W7o (mm) | 11.0 | 9.0 | 9.5 | 14.0 | 11.0 | 11.0 |
| width W7i (mm) | 9.0 | 11.0 | 9.0 | 9.0 | 9.0 | 9.0 |
| W7o/W7i | 1.22 | 0.81 | 1.06 | 1.56 | 1.22 | 1.22 |
| V-shaped bent surface | with | with | with | with | without | with |
| angle $\alpha 1$ (deg.) | 145 | 145 | 145 | 145 | — | 145 |
| Shoulder block | | | | | | |
| width W7o (mm) | 7.0 | 7.0 | 7.0 | 7.0 | 7.0 | 10.0 |
| width W7i (mm) | 10.0 | 10.0 | 10.0 | 10.0 | 10.0 | 7.0 |
| W7o/W7i | 0.7 | 0.7 | 0.7 | 0.7 | 0.7 | 1.43 |
| V-shaped bent surface | with | with | with | with | with | with |
| angle $\alpha 1$ (deg.) | 160 | 160 | 160 | 160 | 160 | 160 |
| Test results | | | | | | |
| steering stability | 6 | 7 | 8 | 8 | 6 | 7 |
| ride comfort | 9 | 9 | 9 | 9 | 9 | 9 |
| ground contacting feeling | 9 | 9 | 9 | 9 | 9 | 9 |
| slide controllability | 9 | 6 | 7 | 7 | 6 | 6 |

| Tire | Ex. 12 | Ex. 13 | Ex. 14 | Ex. 15 | Ex. 16 | Ex. 17 |
|---|---|---|---|---|---|---|
| Tread developed view | FIG. 3 | FIG. 3 | FIG. 3 | FIG. 8 | FIG. 3 | FIG. 3 |
| Cut block view | with FIG. 4(a) | with FIG. 4(a) | with FIG. 4(a) | with FIG. 4(a) | with FIG. 9(a) | with FIG. 10 |
| displacement P1 (mm) | 1.0 | 1.0 | 1.0 | 1.0 | 1.0 | 1.0 |
| displacement P2 (mm) | 2.0 | 2.0 | 2.0 | 2.0 | 2.0 | 2.0 |
| rubber hardness (deg.) | 80 | 80 | 80 | 80 | 80 | 80 |
| Center block | | | | | | |
| width W7o (mm) | 7.0 | 7.0 | 7.0 | 7.0 | 7.0 | 7.0 |
| width W7i (mm) | 8.5 | 8.5 | 8.5 | 8.5 | 8.5 | 8.5 |
| W7o/W7i | 0.82 | 0.82 | 0.82 | 0.82 | 0.82 | 0.82 |
| Middle block | | | | | | |
| width W7o (mm) | 11.0 | 11.0 | 11.0 | 11.0 | 11.0 | 11.0 |
| width W7i (mm) | 9.0 | 9.0 | 9.0 | 9.0 | 9.0 | 9.0 |
| W7o/W7i | 1.22 | 1.22 | 1.22 | 1.22 | 1.22 | 1.22 |
| V-shaped bent surface | with | with | with | with | with | with |
| angle $\alpha 1$ (deg.) | 145 | 145 | 145 | 145 | 145 | 145 |
| Shoulder block | | | | | | |
| width W7o (mm) | 4.0 | 9.5 | 7.0 | 7.0 | 7.0 | 7.0 |
| width W7i (mm) | 10.0 | 10.0 | 10.0 | 10.0 | 10.0 | 10.0 |
| W7o/W7i | 0.4 | 0.95 | 0.7 | 0.7 | 0.7 | 0.7 |
| V-shaped bent surface | with | with | without | with | with | with |
| angle $\alpha 1$ (deg.) | 160 | 160 | — | 160 | 160 | 160 |
| Test results | | | | | | |
| steering stability | 8 | 8 | 7 | 10 | 7 | 8 |
| ride comfort | 9 | 9 | 9 | 8 | 8 | 9 |
| ground contacting feeling | 9 | 9 | 9 | 8 | 7 | 9 |
| slide controllability | 7 | 7 | 6 | 9 | 6 | 9 |

The invention claimed is:

1. A motorcycle tire for running on rough terrain comprising a tread portion having a tread surface and provided with a plurality of blocks including a cut block,
the cut block is provided with a U-shaped cut with two ends opened so as to define a sub part of the cut block surrounded by the cut and a main part of the cut block outside the cut,
a top surface of the sub part and a top surface of the main part are displaced from each other in a normal direction to the tread surface,
an exposed outside wall surface of the sub part and an exposed outside wall surface of the main part are displaced from each other in a lateral direction parallel with the tread surface, wherein
the exposed outside wall surface of the sub part is defined as extending radially inwardly from the edge of the top surface of the sub part, and
the exposed outside wall surface of the main part is defined as extending radially inwardly from the edge of the top surface of the main part and positioned on each side of the exposed outside wall surface of the sub part.

2. The motorcycle tire for running on rough terrain according to claim 1, wherein
the top surface of the sub part protrudes from the top surface of the main part, and
the outside wall surface of the sub part protrudes from the outside wall surface of the main part.

3. The motorcycle tire for running on rough terrain according to claim 1, wherein the top surface of the main part protrudes from the top surface of the sub part, and the outside wall surface of the main part protrudes from the outside wall surface of the sub part.

4. The motorcycle tire for running on rough terrain according to claim 1, wherein the amount of displacement between the top surface of the sub part and the top surface of the main part is 0.3 to 3.0 mm, and the amount of displacement between the outside wall surface of the sub part and the outside wall surface of the main part is 0.3 to 3.0 mm.

5. The motorcycle tire for running on rough terrain according to any claim 1, wherein the sub part is tapered towards its exposed outside wall surface.

6. The motorcycle tire for running on rough terrain according to claim 1, wherein the sub part is inverse tapered towards its exposed outside wall surface.

7. The motorcycle tire for running on rough terrain according to claim 1, wherein the outside wall surface of the sub part is a V-shaped bent surface made up of two substantially-flat surfaces intersecting each other so as to form a ridge extending in the heightwise direction of the cut block and protruding outward of the cut block.

8. The motorcycle tire for miming on rough terrain according to claim 1, wherein said plurality of blocks include center blocks as the cut block disposed on the tire equator, shoulder blocks as the cut block disposed along the tread edged, and middle blocks as the cut block disposed between the center blocks and the shoulder blocks.

9. The motorcycle tire for running on rough terrain according to claim 8, wherein the sub part of the middle block as the cut block is oriented toward the axially outside.

10. The motorcycle tire for running on rough terrain according to claim 8, wherein the sub part of the shoulder block as the cut block is oriented toward the axially inside.

11. The motorcycle tire for running on rough terrain according to claim 8, wherein the sub part of the center block as the cut block is oriented toward one circumferential direction.

12. The motorcycle tire for running on rough terrain according to claim 8, wherein the sub part of the middle block as the cut block is oriented in an oblique direction.

13. The motorcycle tire for running on rough terrain according to claim 12, wherein the sub part of the shoulder block as the cut block is oriented in the opposite direction to said oblique direction of the middle block so as to confront with said outside wall surface of the middle block.

14. The motorcycle tire for running on rough terrain according to claim 13, wherein the sub part of the center block as the cut block is oriented toward one circumferential direction.

15. The motorcycle tire for running on rough terrain according to claim 1, wherein the U-shaped cut is U-shaped with substantially-right-angled corners when viewed from above the cut block.

16. The motorcycle tire for running on rough terrain according to claim 1, wherein the U-shaped cut is U-shaped with round corners when viewed from above the cut block.

17. The motorcycle tire for running on rough terrain according to claim 2, wherein the amount of displacement between the top surface of the sub part and the top surface of the main part is 0.3 to 3.0 mm, and the amount of displacement between the outside wall surface of the sub part and the outside wall surface of the main part is 0.3 to 3.0 mm.

18. The motorcycle tire for running on rough terrain according to claim 3, wherein the amount of displacement between the top surface of the sub part and the top surface of the main part is 0.3 to 3.0 mm, and the amount of displacement between the outside wall surface of the sub part and the outside wall surface of the main part is 0.3 to 3.0 mm.

19. The motorcycle tire for running on rough terrain according to claim 2, wherein the sub part is tapered towards its exposed outside wall surface.

20. The motorcycle tire for running on rough terrain according to claim 3, wherein the sub part is tapered towards its exposed outside wall surface.

* * * * *